Nov. 21, 1967  R. BLEASBY  3,353,848
SELF-ALIGNING PRESSURE SLEEVE
Filed Jan. 19, 1966  3 Sheets-Sheet 1

By John Maier, III
Attorney

United States Patent Office 3,353,848
Patented Nov. 21, 1967

3,353,848
SELF-ALIGNING PRESSURE SLEEVE
Robert Bleasby, Merton Park, England, assignor to Foster Wheeler Corporation, New York, N.Y., a corporation of New York
Filed Jan. 19, 1966, Ser. No. 521,648
Claims priority, application Great Britain,
Jan. 22, 1965, 3,019/65
2 Claims. (Cl. 285—19)

ABSTRACT OF THE DISCLOSURE

A self-aligning pressure sleeve utilizing two end rings and an intermediate sleeve which has a convex part-spherical surface at each end, the end rings each having concave part-spherical surfaces engaging the convex part-spherical surfaces.

---

In tube and shell heat exchangers in which the tubes are connected to a header within the shell, it is sometimes necessary to gain access to the inside of the header. For example one of the tubes may have failed and be leaking and it is then necessary to plug the end of the tube to prevent further leakage.

In order to allow access to the inside of the headers at least one end of the header has a hole which is normally sealed by a removable closure and a hole is provided in the shell which is approximately aligned with the hole in the end of the header and which is normally sealed by a removable closure. When access is to be gained to the inside of the header the closures are removed.

When one wishes to search for a faulty leaking tube the water or other fluid in the shell is pressurised and a viewing instrument such as an introscope is used to discover which tube is leaking into the header so that this tube can be plugged. In order, however, to pressurise the fluid in the shell the gap between the shell and the header must be bridged by a connector and this must be able to withstand the pressurising and must also be a sealing fit with the holes which may not be accurately aligned.

It is an object of the invention to provide such a connector.

According to the invention there is provided a connector for providing access to a tube header housed within the shell of a tubular heat exchanger comprising an end part which can be passed through a hole in the shell and connected to an end of the header after removal therefrom of a closure covering a hole therein, another end part which can be connected to the shell at the hole therein, and an intermediate sleeve having on it part-spherical surfaces mating with complementary part-spherical surfaces on the end parts with a seal between the mating surfaces, whereby misalignment of the axes of the holes in the shell and header can be accommodated when the connector is fixed between the shell and header.

Preferably the end parts are rings positioned around the sleeve and then an unobstructed passage is provided through the connector which is almost as large in diameter as the holes provided in the shell and header. Therefore these holes can be of a reasonable diameter and do not necessitate a considerable increase in the thickness of the shell and header.

Once the connector in accordance with the invention is in place between the shell and header, fluid in the shell can be pressurised to test for leaking tubes while the connector maintains a seal between the inside of the header and the inside of the shell.

In a preferred embodiment of the invention at least one of the part-spherical surfaces of the intermediate sleeve is formed on a ring member slidable along the outside of at least part of the intermediate sleeve in sealing engagement with it, so that the length of the connecting sleeve is adjustable to accommodate irregularities in the spacing between the holes in the header and in the shell.

A connector in accordance with the invention will now be described, by way of example, with reference to the accompanying drawings, in which.

Figure 1:
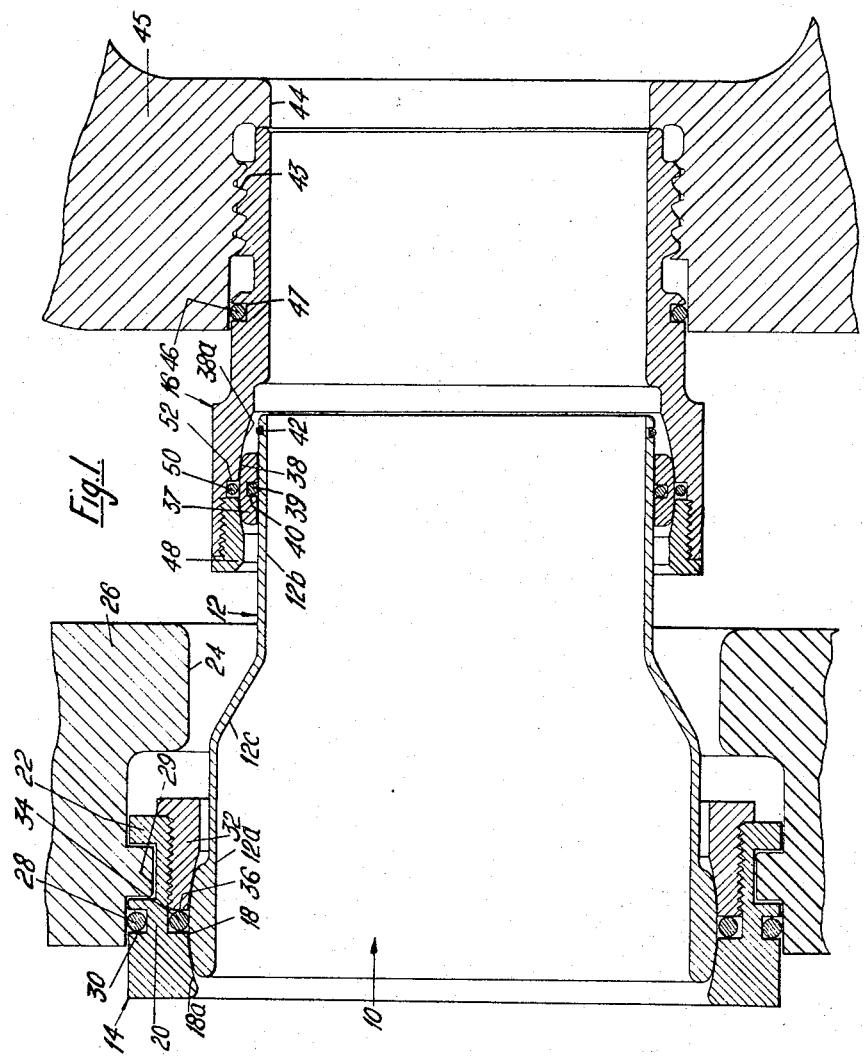
FIGURE 1 is a longitudinal sectional elevation of the connector.
Figure 2:
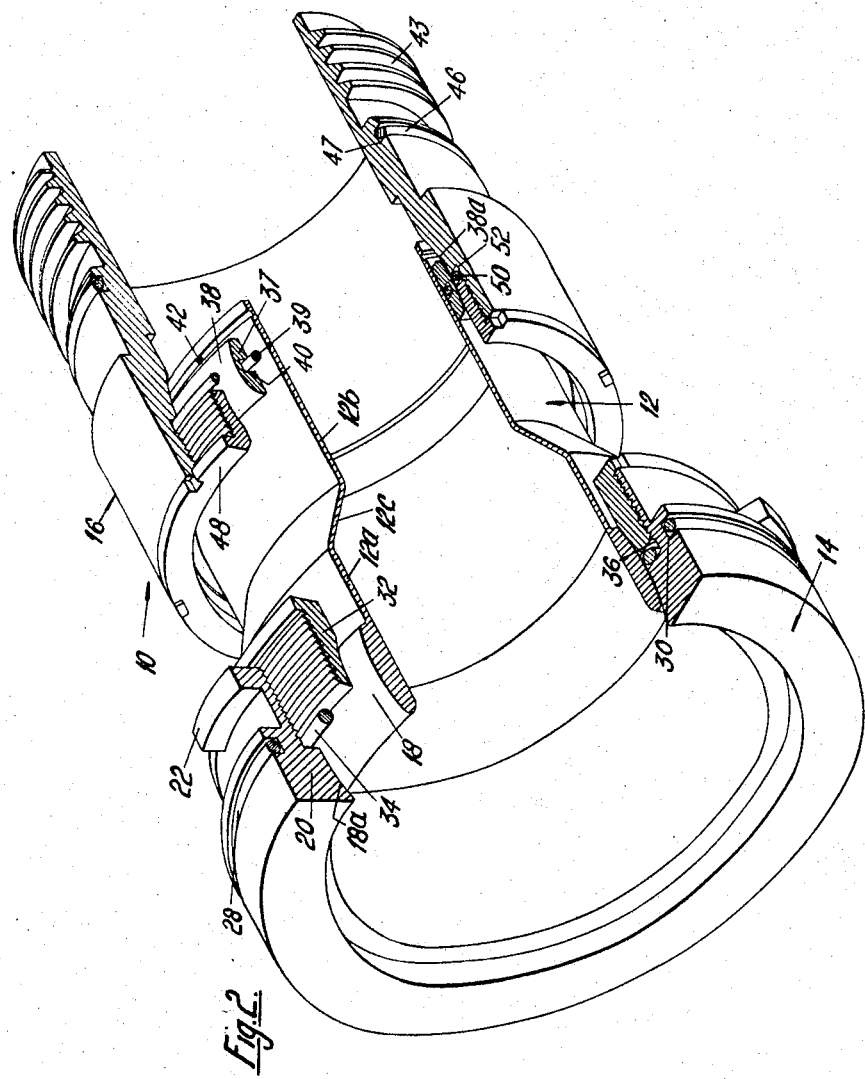
FIGURE 2 is a cut-away perspective view of the connector.

The connector 10 shown in the drawings includes an intermediate sleeve 12 which is positioned between end rings 14 and 16. The intermediate sleeve 12 has a cylindrical part 12a of larger internal diameter and a cylindrical part 12b of smaller internal diameter. The parts 12a and 12b are joined by a tapering part 12c. Near to the left-hand end as shown in FIGURE 1 the outer surface of the sleeve 12 has a thicker portion which is shaped so as to define a part-spherical surface 18.

Figure 3:
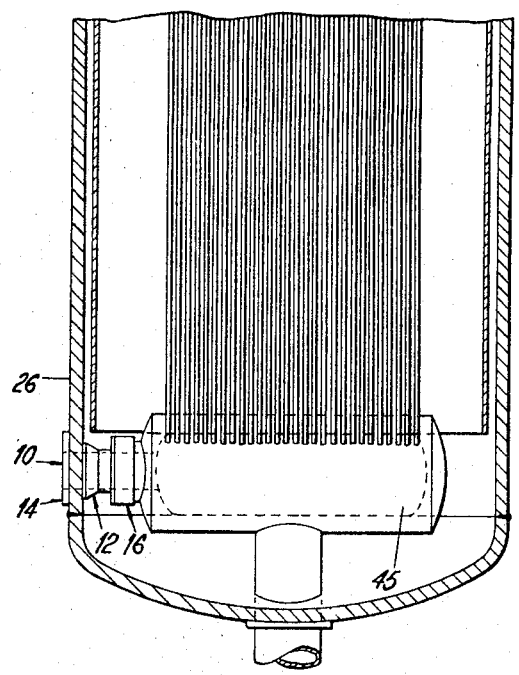
FIGURE 3 is a sectional elevational detail showing the connector positioned between a header and the pressure shell in a heat exchanger.

The end ring 14 comprises a member 20 provided with bayonet lugs 22 on its outer surface for locking it in position in an access hole 24 in a shell 26 of a tubular heat exchanger as shown in FIGURES 1 and 3. For this purpose the shell 26 has a projecting ring 29 against which the lugs 22 bear. An O ring seal 28 is positioned in a circumferential recess 30 in the outer surface of the member 20 to provide a seal between the connector 14 and the shell 26.

A ring-shaped insert 32 is threaded into a corresponding recess in the inner surface of the member 20, and this insert and the member together define a part-spherical surface 18a corresponding to the surface 18. In this way the sleeve 12 is held by the end ring and yet is allowed to pivot a small amount in any direction. To allow this it will be noted that the inner diameter of the insert 32 is larger than the outer diameter of the part 12a of the sleeve 12. An O ring seal 34 is provided in a gap 36 defined between the member 20 and the insert 32 when the latter is screwed tight, and this ring contacts the surface 18 and provides a seal between the end ring 14 and the sleeve 12.

Fitted over the cylindrical part 12b is a bearing ring member 37, the outer surface of which has a part-spherically shaped surface 38. An O ring seal 39 is provided in a recess 40 in the ring member 37 to provide a seal between the ring member 37 and the part 12b of the sleeve 12 while still allowing the ring member 37 to slide longitudinally along the part 12b of the sleeve. The ring member is prevented from being accidentally pulled off the part 12b by a retaining ring 42 fixed in a recess in the outer surface of the part 12b.

The end ring 16 has an external threading 43 by which it is screwed into an access hole 44 in the end of a tube header 45 and an O ring seal 46 is provided in an annular groove 47 to give a good seal between the ring 16 and the header.

A ring-shaped insert 48 is threaded into the end of the ring 16, and this insert and the connector together define a part-spherically shaped surface 38a which corresponds to the surface 38, and which fits closely around the surface 38 when the insert 48 is screwed home so as to hold the ring member 37 and prevent its removal. An O ring seal 50 is provided in an annular gap 52 defined between the ring 16 and the insert 48 when the latter is screwed tight; the O ring seal 50 also contacts the surface 38 so as to give a good seal.

The surfaces 38 and 38a allow a certain amount of pivoting of the sleeve 12 relatively to the end ring 16 and to allow this the inner diameter of the insert 48 is greater than the outer diameter of the sleeve 12. Also it will be noted that the ring member 37 can slide along the outside of the sleeve 12 and still maintain a good seal.

The connector 10 is shown in FIGURES 1 and 3 connected between a tube header 45 positioned within a tubular heat exchanger shell 26. For purposes of convenience the left end of the connector 10 will be termed the outside end while the opposite end will be termed the inside end. The sleeve is fitted in place by first removing the covers (not shown) which are normally positioned over the access hole 24 in the pressure shell and the access hole 44 in the header 45, and then inserting the end ring 16 and the intermediate sleeve 12 through the hole 24 in the shell. It will be noted that the diameter of the ring 16 must be small enough to allow it to pass through the hole 24. The end ring 16 is rotated from inside the sleeve so that it is threaded into the hole 44 and a seal made between it and the header. Then the end ring 14 can be fixed in place by locking the lugs 22 in position.

In fixing the sleeve in place the surfaces 18 and 18a and 38 and 38a allow a small amount of pivoting of the ring 14 relatively to the sleeve 12 and the ring 16 relatively to the sleeve 12, respectively, and so compensate for any misalignment between the axes of the holes 24 and 44. Also the ability of the ring member 37 to slide along the part 12b means that the spacing between the holes 24 and 44 does not have to be accurately defined, and can even change slightly while the sleeve is in place.

As will be clearly seen from the drawings the connector 10 provides an unobstructed passage which has a diameter very little smaller than the holes in the shell and header. This is a material advantage when the shell and header are subject to large working pressures since the provision of large holes can considerably increase the necessary thickness of the shell and header.

Once the connector is in position between the shell and header water in the shell can be pressurised to test and look for any leaks and the connector forms a seal both with the shell and the header. Any necessary work can be effected on the inside of the header with, for example, the remotely operated tool.

Once work inside the header is finished the connector can be removed and the holes closed again with the covers (not shown), and the heat exchanger can be used again.

The connector 10 just described can be used to connect a header and a pressure shell together as shown or can be used to connect any other members together such as two pressure shells or two headers and, when connected in place, it can withstand both internal and external excess pressure.

Although the end ring 14 has been described as having lugs 22 for connection to the pressure shell it may be screwed into the shell. Similarly the end ring 16 may have bayonet lugs for connection to the header. The end rings can also be welded to the shell and/or the header if a permanent joint is required while still allowing slight changes due for example to thermal expansion.

The intermediate sleeve 12 as shown in the drawings is tapered from one end to the other end. This is not essential and if desired it may have the same internal cross-sectional area throughout its length.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed.

I claim:

1. A connector for providing access to a tube header housed within a shell of a tubular heat exchanger which shell has a hole therein normally closed by a removable closure comprising:

a first end ring having a generally cylindrical shape adaptable to be passed through a shell hole with radially inwardly projecting means in a shell, said first end ring having a first inner portion and a first outer portion, said first inner portion having an external thread adapted to engage a threaded header hole in a header after removal therefrom of a closure, said first outer portion extending beyond said header toward said shell hole, said first outer portion having a first internal thread;

a first sealing means between said first end ring and said header hole in the header;

a first insert means having a ring shape and a first external thread adapted to engage said first internal thread, said first insert and said first outer portion forming a first concave part-spherical surface;

a second end ring having a generally cylindrical shape, said second end ring having a second inner portion and a second outer portion, said second inner portion having externally mounted bayonet lugs adapted to engage said inwardly projecting means from the shell hole and further having a second internal thread;

a second sealing means between said second end ring and said shell hole;

a second insert means having a ring shape and a second external thread adapted to engage said internal thread, said second insert and said second end ring forming a second concave part-spherical surface;

an intermediate sleeve having an intermediate inside end and an intermediate outside end, said intermediate sleeve including a second intermediate convex part-spherical surface at said intermediate outside end adapted to engage said second concave part-spherical surface;

a ring member slidably mounted on said intermediate inside end and having a first intermediate convex part-spherical surface adapted to engage said first concave part-spherical surface;

a first intermediate sealing means located between said first intermediate convex part-spherical surface and said first concave part-spherical surface;

a second intermediate sealing means located between said second end ring and said second insert means and between said second intermediate concave part-spherical surface and said second intermediate convex part-spherical surface;

a third intermediate sealing means located between said ring member and said intermediate inside end; and a retaining ring located about said intermediate inside end adjacent said ring member to prevent said ring member from sliding off said intermediate inside end.

2. A connector according to claim 1 wherein said intermediate sleeve includes a larger diameter cylindrical part, a smaller diameter cylindrical part, and a tapering part integrally joining said larger diameter cylindrical part and said smaller diameter cylindrical part, the inside end being located on the smaller diameter cylindrical part and the outside end being located in the larger diameter cylindrical part.

(References on following page)

References Cited

UNITED STATES PATENTS

| | | | |
|---|---|---|---|
| 935,996 | 10/1909 | Koenig | 285—166 X |
| 1,889,606 | 11/1932 | Lang | 285—376 X |
| 2,342,192 | 2/1944 | Grigsby. | |
| 2,564,938 | 8/1951 | Warren | 285—166 X |
| 2,634,164 | 4/1953 | Drake | 165—76 X |
| 2,908,138 | 10/1959 | Warren | 285—166 X |
| 2,955,850 | 10/1960 | Bellinger | 285—166 X |
| 2,976,064 | 3/1961 | Croy | 285—165 |
| 3,133,754 | 5/1964 | Peters | 285—166 X |

FOREIGN PATENTS

| | | |
|---|---|---|
| 120,752 | 5/1901 | Germany. |
| 771,968 | 4/1957 | Great Britain. |

CARL W. TOMLIN, *Primary Examiner.*

R. G. BERKLEY, *Assistant Examiner.*